(12) United States Patent
Hung et al.

(10) Patent No.: US 11,079,877 B1
(45) Date of Patent: Aug. 3, 2021

(54) DISPLAY DRIVING CIRCUIT AND DISPLAY DEVICE HAVING THE SAME

(71) Applicant: AU Optronics Corporation, Hsin-Chu (TW)

(72) Inventors: Chih-Hao Hung, Hsin-Chu (TW); Hung-Chi Wang, Hsin-Chu (TW); Ya-Fang Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/997,978

(22) Filed: Aug. 20, 2020

(30) Foreign Application Priority Data

Mar. 17, 2020 (TW) .................................. 109108852

(51) Int. Cl.
*G06F 3/041* (2006.01)
*G09G 3/36* (2006.01)
*G09G 3/3225* (2016.01)

(52) U.S. Cl.
CPC .......... *G06F 3/0418* (2013.01); *G06F 3/0412* (2013.01); *G09G 3/3225* (2013.01); *G09G 3/3648* (2013.01); *G09G 2310/0286* (2013.01); *G09G 2310/0291* (2013.01); *G09G 2310/0297* (2013.01); *G09G 2360/14* (2013.01)

(58) Field of Classification Search
CPC ... G06F 3/0418; G06F 3/0412; G09G 3/3225; G09G 3/3648; G09G 2310/0286; G09G 2310/0291; G09G 2310/0297; G09G 2360/14
See application file for complete search history.

(56) References Cited

U.S. PATENT DOCUMENTS

| 2004/0113877 | A1* | 6/2004 | Abileah | G06F 3/0412 345/92 |
| 2008/0198143 | A1* | 8/2008 | Kinoshita | G06F 3/0412 345/175 |
| 2011/0007047 | A1 | 1/2011 | Fujioka et al. | |
| 2011/0012844 | A1* | 1/2011 | Chang | G06F 3/042 345/173 |
| 2011/0115733 | A1* | 5/2011 | Shih | G06F 3/047 345/173 |
| 2013/0009888 | A1* | 1/2013 | Park | G06F 3/0421 345/173 |
| 2016/0224163 | A1 | 8/2016 | Kim et al. | |

(Continued)

*Primary Examiner* — Hong Zhou
(74) *Attorney, Agent, or Firm* — WPAT, PC

(57) ABSTRACT

A display driving circuit, suitable for a display device, includes multiple data circuits and multiple reading circuits. Each data circuit is configured to provide multiple data signals to corresponding ones of data lines of the display device. Each reading circuit is configured to compare multiple sensing signals on corresponding ones of sensing lines of the display device to generate a sensing result, and is configured generate multiple coupling signals according to the multiple data signals of a corresponding one of the multiple data circuits, respectively. The reading circuit is further configured to provide the multiple coupling signals to the corresponding ones of the multiple sensing lines. When the multiple data signals have one or more rising edges, the multiple coupling signals have one or more positive pulses. When the multiple data signals have one or more falling edges, the multiple coupling signals have one or more negative pulses.

20 Claims, 7 Drawing Sheets

(56) References Cited

U.S. PATENT DOCUMENTS

| | | |
|---|---|---|
| 2017/0168648 A1 | 6/2017 | Takahashi |
| 2018/0090111 A1* | 3/2018 | Kozuma |
| 2019/0227652 A1* | 7/2019 | Kwon ................. G06F 3/04166 |
| 2020/0033994 A1* | 1/2020 | Shin ...................... G02F 1/1368 |
| 2020/0090607 A1* | 3/2020 | Hung .................. G02F 1/13306 |
| 2020/0159385 A1* | 5/2020 | Chung ................ G06F 3/04166 |

* cited by examiner

US 11,079,877 B1

DISPLAY DRIVING CIRCUIT AND DISPLAY DEVICE HAVING THE SAME

CROSS-REFERENCE TO RELATED APPLICATION

This application claims priority to Taiwan Application Serial Number 109108852, filed Mar. 17, 2020, which is herein incorporated by reference in its entirety.

BACKGROUND

Technical Field

The present disclosure relates to a display driving circuit, and more particularly, to a display driving circuit capable of eliminating noise on sensing lines.

Description of Related Art

Large-sized interactive displays have high-quality images and can be operated by touch or light pen, and thus have gradually substituted for projectors and become an important auxiliary tool in meetings. The sensing lines for transmitting the operation result of the user on the panel are usually set adjacent to the data lines for transmitting gray-scale data. The variation of the voltage on the data lines will cause noise on the sensing lines, and the degree of the noise is positively correlated to the resolution or frame rate of the display. Accordingly, the interactive displays often misjudge the user's operating position.

SUMMARY

The present disclosure is to provide a display driving circuit, which is suitable for a display device including multiple data lines and multiple sensing lines. The display driving circuit includes multiple data circuits and multiple reading circuits. Each data circuit is configured to provide multiple data signals to corresponding ones of the multiple data lines. Each reading circuit is configured to compare multiple sensing signals on corresponding ones of the multiple sensing lines to generate a sensing result, and is configured generate multiple coupling signals according to the multiple data signals of a corresponding one of the multiple data circuits, respectively. The reading circuit is further configured to provide the multiple coupling signals to each of the corresponding ones of the multiple sensing lines. When the multiple data signals have one or more rising edges, the multiple coupling signals have one or more positive pulses. When the multiple data signals have one or more falling edges, the multiple coupling signals have one or more negative pulses.

The present disclosure is to provide a display driving circuit, which is suitable for a display device including multiple data lines and multiple sensing lines. The display driving circuit includes multiple data circuits and multiple reading circuits. Each data circuit is configured to provide multiple data signals to corresponding ones of the multiple data lines. Each reading circuit is configured to compare multiple sensing signals on corresponding ones of the multiple sensing lines to generate a sensing result, and is configured generate multiple coupling signals according to the multiple data signals of a corresponding one of the multiple data circuits, respectively. The reading circuit is further configured to provide the multiple coupling signals to the corresponding ones of the multiple sensing lines, respectively. When the multiple data signals have one or more rising edges, the multiple coupling signals have one or more positive pulses. When the multiple data signals have one or more falling edges, the multiple coupling signals have one or more negative pulses.

The present disclosure is to provide a display device which includes multiple data lines, multiple sensing lines, and a display driving circuit. The display driving circuit includes multiple data circuits and multiple reading circuits. Each data circuit is configured to provide multiple data signals to corresponding ones of the multiple data lines. Each reading circuit is configured to compare multiple sensing signals on corresponding ones of the multiple sensing lines to generate a sensing result, and is configured generate multiple coupling signals according to the multiple data signals of a corresponding one of the multiple data circuits, respectively. The reading circuit is further configured to provide the multiple coupling signals to each of the corresponding ones of the multiple sensing lines. When the multiple data signals have one or more rising edges, the multiple coupling signals have one or more positive pulses. When the multiple data signals have one or more falling edges, the multiple coupling signals have one or more negative pulses.

The aforementioned display driving circuit and display device can obtain the correct sensing result without being affected by the noise of the sensing signal.

DETAILED DESCRIPTION

Figure 1:
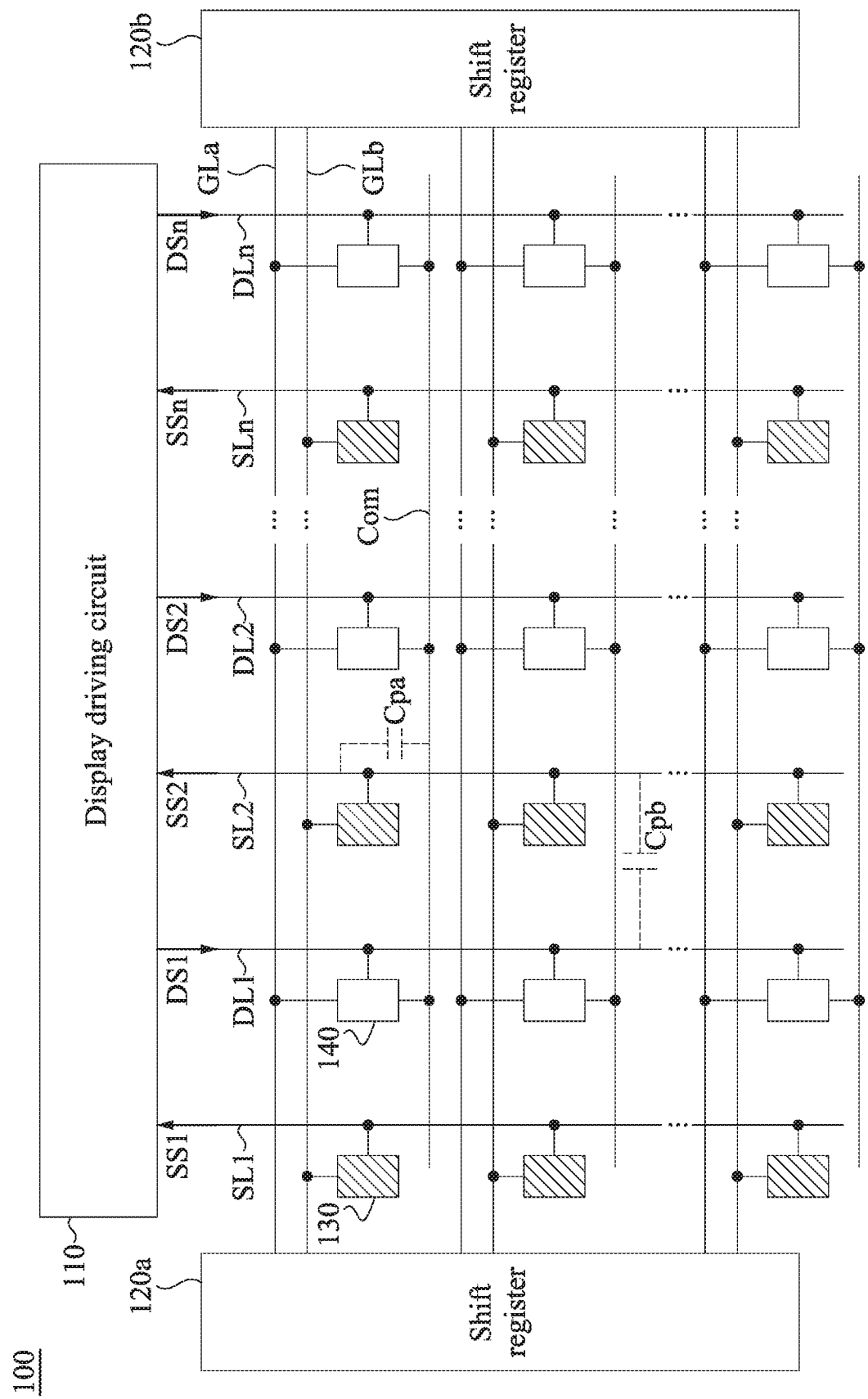
FIG. 1 is a simplified functional block diagram of a display device according to an embodiment of the present disclosure.

Reference will now be made in detail to the present embodiments of the disclosure, examples of which are illustrated in the accompanying drawings. In the drawings, the same reference numerals indicate the same or similar elements or method flows.

FIG. 1 is a simplified functional block diagram of a display device 100 according to an embodiment of the present disclosure. The display device 100 includes a display driving circuit 110, shift registers 120a and 120b, multiple light sensing pixels 130, multiple display pixels 140, multiple first gate lines GLa, multiple second gate lines GLb, multiple sensing lines SL1-SLn and multiple data lines DL1-DLn. The multiple first gate lines GLa and the multiple second gate lines GLb are coupled to the shift registers 120a and 120*b*. The first gate line GLa is configured to control the display pixels 140 to receive data signals DS1-DSn from the data lines DL1-DLn. The second gate line GLb is configured to control the light-sensing pixels 130 to output charges to the sensing lines SL1-SLn for being used as sensing signals SS1-SSn on the sensing lines SL1-SLn, in which the amount of charges outputted from each light-sensing pixel 130 is corresponding to the intensity of incident light thereof.

The display driving circuit 110 is coupled to the data lines DL1-DLn and the sensing lines SL1-SLn, and is configured to provide the data signals DS1-DSn for assigning the gray scale value (or brightness) of each display pixel 140. The display driving circuit 110 is also configured to receive the sensing signals SS1-SSn, and perform signal processing, such as amplifying, filtering, analog-to-digital conversion, etc., on the sensing signals SS1-SSn. In an embodiment, the display driving circuit 110 is also configured to provide clock signals and vertical synchronization signals to the shift registers 120*a* and 120*b*.

Moreover, the light sensing pixels 130 are disposed near to the intersections of the sensing lines SL1-SLn and the second gate line GLb, and the display pixels 140 are disposed near to the intersections of the data lines DL1-DLn and the first gate lines GLa. In addition, the display pixels 140 are further coupled to the common electrode Com that is configured for voltage stabilization.

Although FIG. 1 shows two shift registers 120*a* and 120*b*, the present disclosure is not limited thereto. In some embodiments where the output loads of the shift registers 120*a* and 120*b* are low, one of the shift registers 120*a* and 120*b* may be omitted. It should be noted that the arrangement of the light-sensing pixels 130 and the display pixels 140 in FIG. 1 is only an exemplary embodiment, and the actual arrangement can be adjusted according to different needs. For example, the light sensing pixels 130 and the display pixels 140 may be arranged in a checkerboard shape.

There may be a parasitic capacitance Cpa between one of the sensing line SL1-SLn and the corresponding adjacent one of data lines DL1-DLn, and there may also be parasitic capacitances Cpb at the intersections of the common electrode Com and the sensing lines SL1 to SLn. Therefore, when the data lines DL1-DLn transmit the data signals DS1-DSn, or when the voltage on the common electrode Com is disturbed, surge noises may be generated on the sensing lines SL1-SLn. The display driving circuit 110 can be configured to eliminate these surge noises, and the detailed operation process is further described in the following paragraphs.

Figure 2:
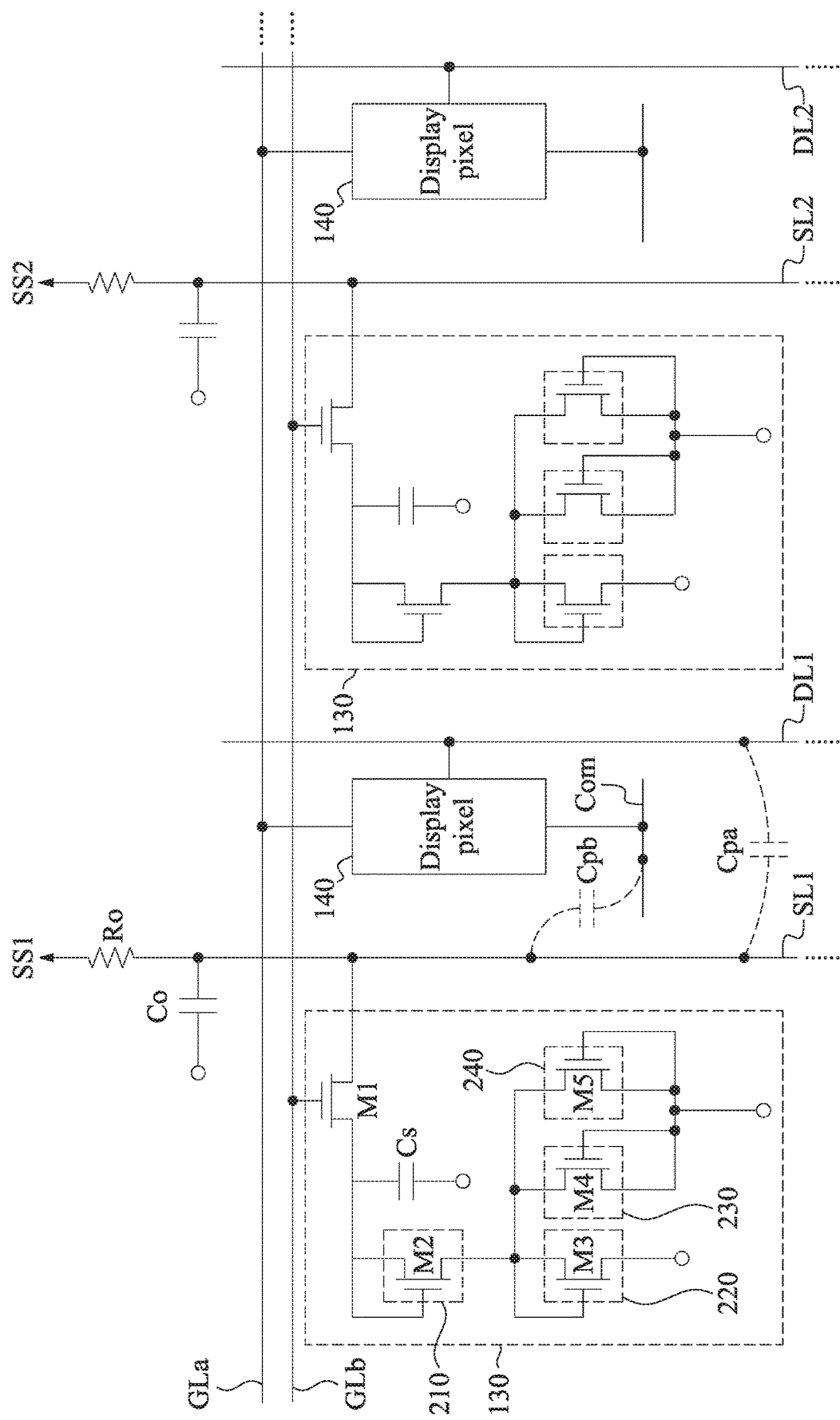
FIG. 2 is a partially enlarged schematic diagram of the display device in FIG. 1.

FIG. 2 is a partially enlarged schematic diagram of the display device 100 in FIG. 1. The light-sensing pixel 130 includes transistors M1-M5, a storage capacitor Cs, and multiple light filters 210-240. The control terminal of the transistor M1 is coupled to the second gate line GLb, and the transistor M1 is configured to output the charge in the storage capacitor Cs to the corresponding one of the sensing lines SL1-SLn. The light filters 210-240 respectively cover the transistors M2-M5, and the transistors M2-M5 are diode-connected transistors. The light filters 210 and 220 have the same color, and each of the light filters 220-240 has different colors. For example, the filters 210 and 220 can pass red light, and the filters 230 and 240 can pass green light and blue light, respectively, but the present disclosure is not limited thereto.

When the light irradiates the transistors M2 and M3 through the light filters 210 and 220, the transistors M2-M3 charge the storage capacitor Cs. The transistors M4-M5 can be configured to prevent the transistors M2-M3 from erroneously charging the storage capacitor Cs due to the ambient light.

As shown in FIG. 2, each of the sensing lines SL1-SLn includes a load capacitor Co and a load resistance Ro, and the voltages on the sensing lines SL1-SLn are periodically reset to the reset voltage Vre (described later). Therefore, taking the sensing signal SS1 as an example, the voltage of the sensing signal SS1 can be expressed by the following "Formula 1". In "Formula 1", the symbol Vss1 represents the voltage of the sensing signal SS1; the symbol Vcs represents the voltage on the top terminal of the storage capacitor Cs; the symbol Vcom_couple represents the noise caused by the common electrode Com on the sensing line SL1; the symbol Data_couple represents the noise caused by one or more of the data lines DL1-DLn on the sensing line SL1.

$$V_{ss1} = \frac{Cs \times (Vcs + \text{Vcom\_couple} + \text{Data\_couple}) + Co \times Vre}{Cs + Co} \quad \text{Formula 1}$$

The light sensing pixel 130 in FIG. 2 is only an exemplary embodiment. In practice, the light-sensing pixel 130 can be implemented by using other suitable photosensitive circuits according to actual needs.

Furthermore, the display pixels 140 may be implemented by various suitable liquid crystal pixel circuits. For example, the display pixel 140 may include a switch transistor whose control terminal is coupled to the first gate line GLa, and include a liquid crystal capacitor and a voltage stablization capacitor, in which the liquid crystal capacitor and the voltage stablization capacitor are coupled between the switch transistor and the common electrodes Com.

In some embodiments, the display pixel 140 may also be implemented by using an organic light-emitting diode (OLED) pixel circuit or a micro LED pixel circuit.

Figure 3:
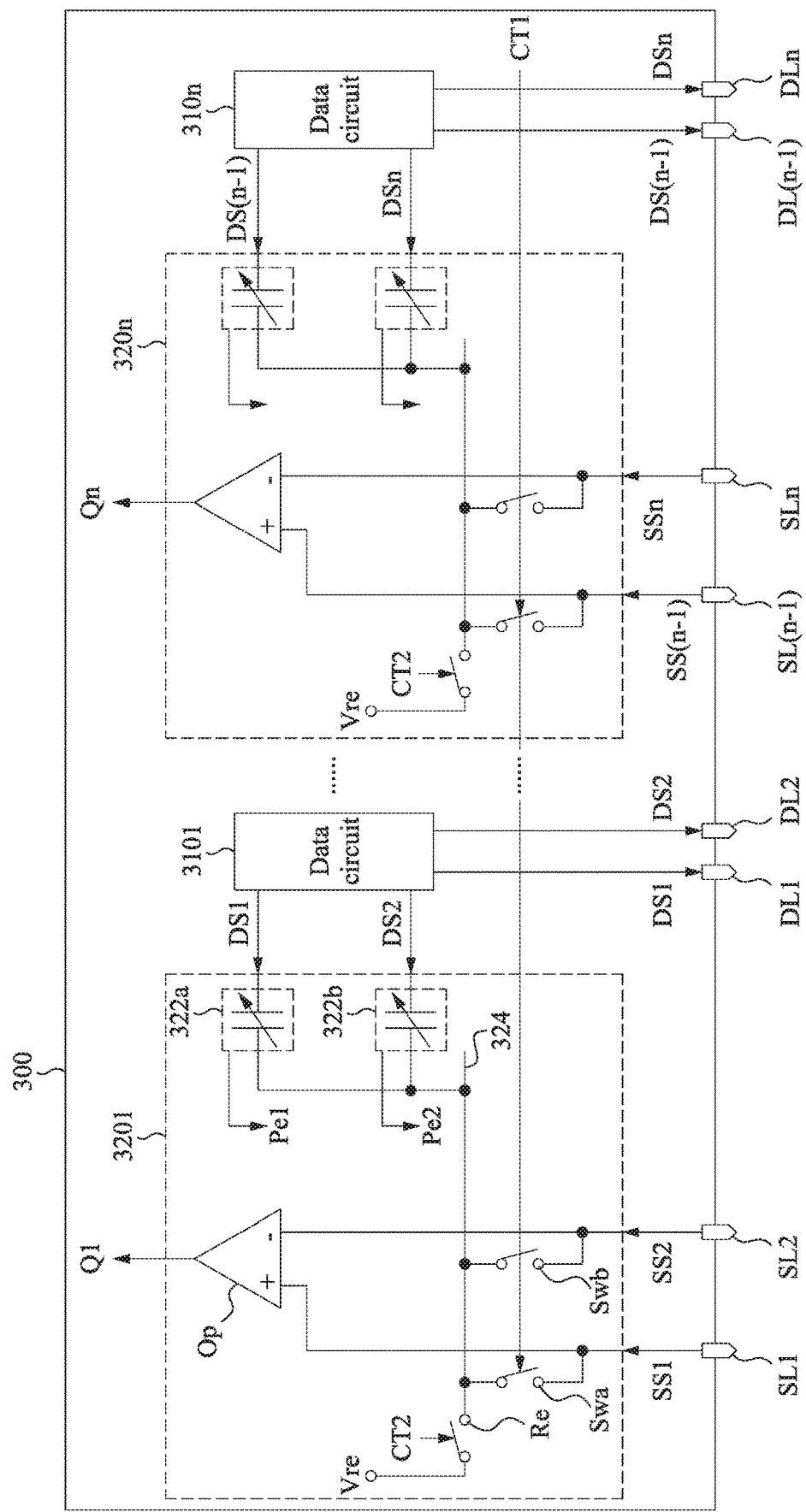
FIG. 3 is a simplified functional block diagram of a display driving circuit according to an embodiment of the present disclosure.

FIG. 3 is a simplified functional block diagram of a display driving circuit 300 according to an embodiment of the present disclosure. The display driving circuit 300 can be configured to implement the display driving circuit 110 in FIG. 1, for example, the display driving circuit 300 can be configured to provide the data signals DS1-DSn, and can perform signal processing on the sensing signals SS1-SSn. The display driving circuit 300 includes multiple data circuits 310१-310*n* and multiple reading circuits 320१-320*n*. Each of the data circuits 310१-310*n* is configured to provide corresponding ones of the data signals DS1-DSn. For example, the data circuit 310१ is configured to provide the data signals DS1 and DS2, the data circuit 310२ is configured to provide the data signals DS3 and DS4, and so on.

The reading circuits 320१-320*n* are respectively coupled to the data circuits 310१-310*n*, and each reading circuit is configured to compare said corresponding ones of the sensing signals SS1-SSn to generate a sensing result (e.g., one of the sensing results Q1, . . . , Qn). The reading circuits 320१-320*n* can eliminate the surge noises on the sensing signals SS1-SSn by differential input. Each of the reading circuits 320१-320*n* has the similar structure. For ease of understanding, the reading circuit 320१ is used as an example for description in the following paragraphs.

The reading circuit 320१ includes a first coupling circuit 322*a*, a second coupling circuit 322*b*, a reset line 324, multiplex switches Swa and Swb, a reset switch Re, and a differential amplifier Op. The first coupling circuit 322*a* and the second coupling circuit 322b are coupled to the data circuit 3101. The first coupling circuit 322a and the second coupling circuit 322b respectively receive the data signals DS1 and DS2 from the data circuit 3101, and are configured to generate a first coupling signal Pe1 and a second coupling signal Pe2 according to the data signals DS1 and DS2, respectively.

The reset line 324 is coupled to the first coupling circuit 322a, the second coupling circuit 322b, the first terminals of the multiplex switches Swa and Swb, and the first terminal of the reset switch Re. The second terminals of the multiplex switches Swa and Swb are respectively coupled to the sensing lines SL1 and SL2, and the control terminals of the multiplex switches Swa and Swb are configured to receive the first control signal CT1 together. The second terminal of the reset switch Re is configured to receive the reset voltage Vre, and the control terminal thereof is configured to receive the second control signal CT2. Therefore, the reset line 324 can be configured to transmit the first coupling signal Pe1 and the second coupling signal Pe2 to the sensing lines SL1 and SL2 together, or to transmit the reset voltage Vre to the sensing lines SL1 and SL2.

In the present embodiment, each multiplex switch Swa and each multiplex switch Swb in the display driving circuit 300 are switched by the same first control signal CT1, but the present disclosure is not limited thereto.

The first terminal (e.g., non-inverting input terminal) and the second terminal (e.g., inverting input terminal) of the differential amplifier Op are configured to be coupled to the sensing lines SL1 and SL2, respectively. The output terminal of the differential amplifier Op is configured to output the sensing result Q1 corresponding to the sensing signals SS1 and SS2.

For example, if the sensing signals SS1 and SS2 have the same voltage, the differential amplifier Op outputs the sensing result Q1 with a high voltage to notify the post-stage operational circuit (not shown in the figure) that the display device 100 currently does not receive the user's operation input. For another example, if the sensing signals SS1 and SS2 have different voltages, the differential amplifier Op output the sensing result Q1 with a low voltage to notify the post-stage operational circuit that the display device 100 receives the user's operation input.

In some embodiments, each of the data circuits 3101-310n may include a shift register, a digital-to-analog converter, a multiplexer, a buffer, and so on. At this time, each of the reading circuits 3201-320n can receive the required data signals DS1-DSn from the lines disposed after the aforementioned digital-to-analog converter.

Figure 4:
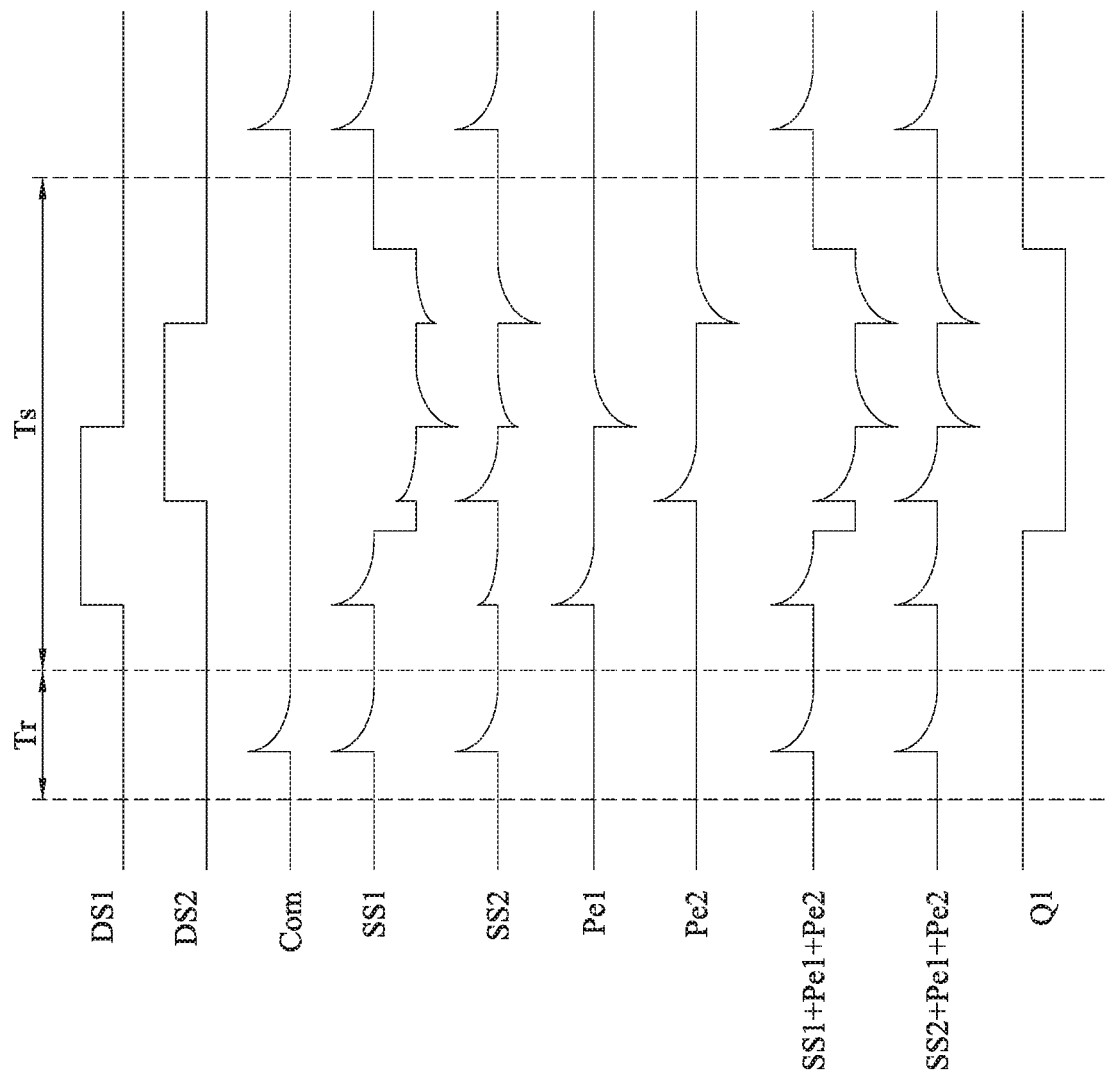
FIG. 4 is a simplified waveform diagram of multiple control signals input to or provided by the display driving circuit in FIG. 3.

FIG. 4 is a simplified waveform diagram of multiple control signals input to or provided by the display driving circuit 300. Reference is made to FIG. 3 in conjunction with FIG. 4. In the reset phase Tr, the reset switch Re is turned on to set the voltages on the reset line 324 and the sensing lines SL1 and SL2 to the reset voltage Vre.

Next, in the sensing phase Ts, the reset switch Re is turned off. Therefore, the first coupling signal Pe1 and the second coupling signal Pe2 are superimposed onto the sensing signals SS1 and SS2 together. When the data signal DS1 has the rising edge, the first coupling signal Pe1 has a positive pulse, and when the data signal DS1 has the falling edge, the first coupling signal Pe1 has a negative pulse. Similarly, when the data signal DS2 has the rising edge, the second coupling signal Pe2 has a positive pulse, and when the data signal DS2 has the falling edge, the second coupling signal Pe2 has a negative pulse.

In other words, when multiple data signals DS1 and DS2 of the data circuit 3101 have one or more rising edges, the first coupling signal Pe1 and the second coupling signal Pe2 have one or more positive pulses correspondingly. Similarly, when the data signals DS1 and DS2 have one or more falling edges, the first coupling signal Pe1 and the second coupling signal Pe2 have one or more negative pulses correspondingly.

Therefore, even if the noise sources on the sensing lines SL1 and SL2 are different (e.g., the main noise sources on the sensing lines SL1 and SL2 are the data lines DL1 and DL2, respectively), the display driving circuit 300 can still adjust the sensing signals SS1 and SS2 to have the noises with the same waveform. In this way, the noises of the sensing signals SS1 and SS2 are completely cancelled out in the differential amplifier Op, so that the display driving circuit 300 can output the correct sensing result Q1 in the operation scenario of high display frame rate with high noise.

In practice, each of the first coupling circuit 322a and the second coupling circuit 322b may include a variable capacitor. The first terminal of the variable capacitor of the first coupling circuit 322a is configured to receive the data signal DS1, and the second terminal thereof is configured to provide the first coupling signal Pe1. Similarly, the first terminal of the variable capacitor of the second coupling circuit 322b is configured to receive the data signal DS2, and the second terminal thereof is configured to provide the second coupling signal Pe2.

In some embodiments, the capacitance value of each variable capacitor is positively correlated to the capacitance value of the corresponding load capacitor Co. For example, the capacitance value of the variable capacitor of the first coupling circuit 322a is positively correlated to the capacitance value of the load capacitor Co on the sensing line SL1, and the capacitance value of the variable capacitor of the second coupling circuit 322b is positively correlated to the capacitance value of the load capacitor Co on the sensing line SL2, and so on.

Figure 5:
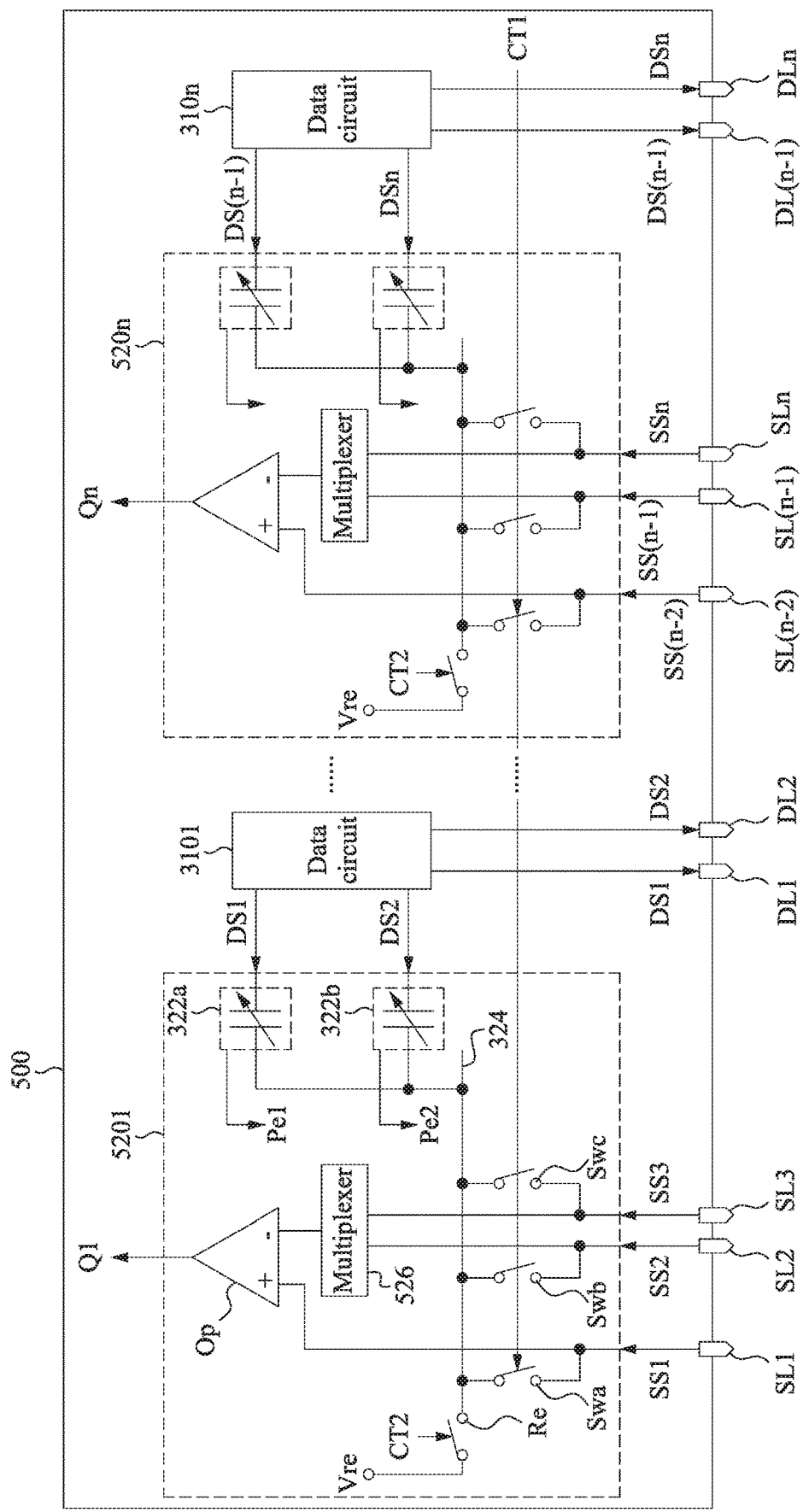
FIG. 5 is a simplified functional block diagram of a display driving circuit according to an embodiment of the present disclosure.

FIG. 5 is a simplified functional block diagram of a display driving circuit 500 according to an embodiment of the present disclosure. The display driving circuit 500 can be configured to implement the display driving circuit 110 in FIG. 1. For example, the display driving circuit 500 can be configured to provide the data signals DS1-DSn, and can perform signal processing on the sensing signals SS1-SSn. The display driving circuit 500 includes the aforementioned data circuits 3101-310n, and includes the reading circuits 5201-520n, in which the reading circuits 5201-520n are coupled to the data circuits 3101-310n, respectively. Each of the reading circuits 5201-520n has the similar structure. For ease of understanding, the reading circuit 5201 is used as an example for description in the following paragraphs.

The reading circuit 5201 includes a first coupling circuit 322a, a second coupling circuit 322b, a reset line 324, a differential amplifier Op, multiplex switches Swa-Swc, a reset switch Re, and a multiplexer 526. An output terminal of the multiplexer 526 is coupled to the second terminal of the differential amplifier Op, and two input terminals of the multiplexer 526 are respectively coupled to the sensing lines SL2 and SL3. The multiplexer 526 is configured to selectively couple the sensing lines SL2 and SL3 to the second terminal of the differential amplifier Op. Moreover, the multiplex switch Swc is coupled between the sensing line SL3 and the reset line 324, and the control terminal thereof is configured to receive the first control signal CT1.

By switching the conduction path of the multiplexer 526, the reading circuit 5201 can selectively compare the sensing signal SS1 with the sensing signal SS2 or compare the sensing signal SS1 on the sensing line SL1 with the sensing signal SS3 on the sensing lines SL3 far away from each other to obtain the sensing result Q1. Therefore, the display driving circuit 500 can be applied to a situation where the sensing target area is large.

During the sensing phase Ts in the present embodiment, the first coupling signal Pe1 and the second coupling signal Pe2 are superimposed on the sensing signals SS1-SS3 together. Therefore, the noises of the sensing signals SS1-SS2 or the noises of the sensing signals SS1 and SS3 are completely cancelled out in the differential amplifier Op, so that the differential amplifier Op can output the correct sensing result Q1. The remaining connection manners, components, embodiments, and advantages of the aforementioned display driving circuit 300 are all applicable to the display driving circuit 500, and the description is not further provided herein for brevity.

Figure 6:
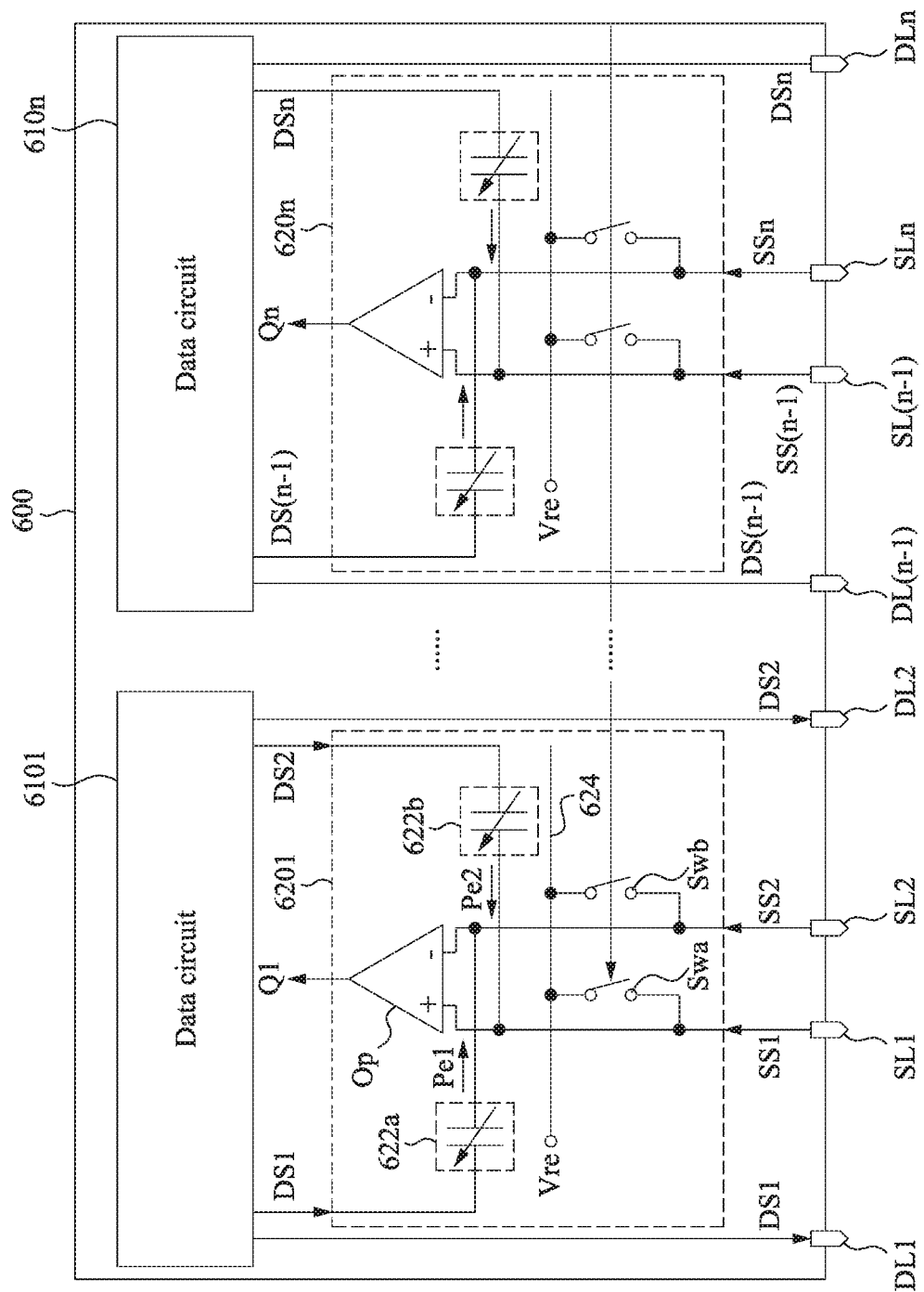
FIG. 6 is a simplified functional block diagram of a display driving circuit according to an embodiment of the present disclosure.
Figure 7:
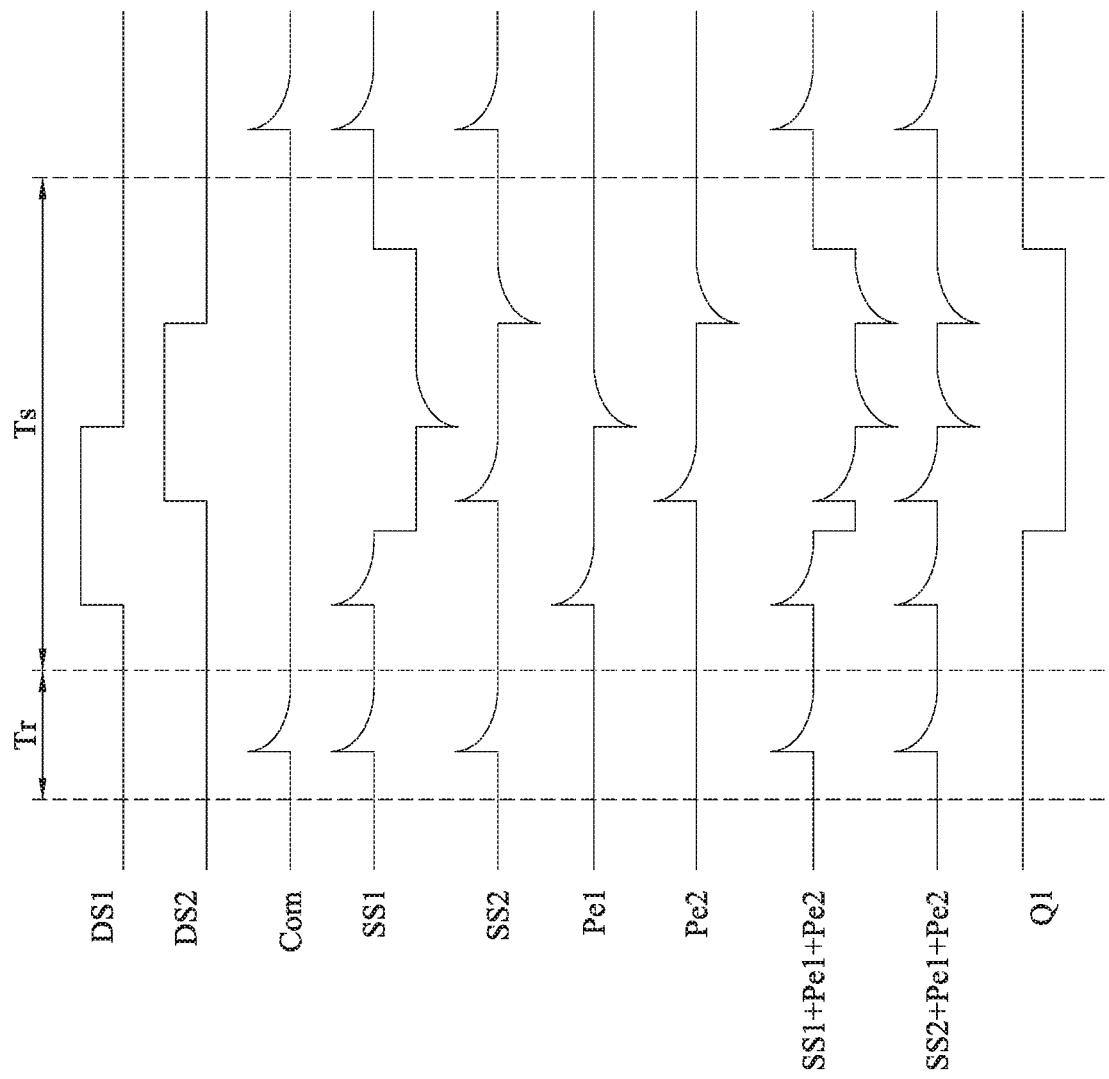
FIG. 7 is a simplified waveform diagram of multiple control signals input to or provided by the display driving circuit in FIG. 6.

FIG. 6 is a simplified functional block diagram of a display driving circuit 600 according to an embodiment of the present disclosure. FIG. 7 is a simplified waveform diagram of multiple control signals input to or provided by the display driving circuit 600. Reference is made to FIG. 6 in conjunction with FIG. 7. The display driving circuit 600 can be configured to implement the display driving circuit 110 in FIG. 1, for example, the display driving circuit 600 can be configured to provide the data signals DS1-DSn, and can perform signal processing on the sensing signals SS1-SSn. The display driving circuit 600 includes data circuits 6101-610n and reading circuits 6201-620n. Each of the data circuits 6101-610n is configured to provide corresponding ones of the data signals DS1-DSn, for example, the data circuit 6101 is configured to provide the data signals DS1 and DS2, the data circuit 6102 is configured to provide the data signals DS3 and DS4, and so on. The reading circuits 6201-620n are respectively coupled to the data circuits 6101-610n, and each of the reading circuits 6201-620n has the similar structure. For ease of understanding, the reading circuit 6201 is used as an example for description in the following paragraphs.

The reading circuit 6201 includes a first coupling circuit 622a, a second coupling circuit 622b, a reset line 624, a differential amplifier Op, and multiplex switches Swa-Swb. The first coupling circuit 622a is configured to receive the data signal DS1 from the data circuit 6101, and configured to provide the first coupling signal Pe1 to the second terminal of the differential amplifier Op according to the data signal DS1. The second coupling circuit 622b is configured to receive the data signal DS2 from the data circuit 6101, and configured to provide the second coupling signal Pe2 to the first terminal of the differential amplifier Op according to the data signal DS2. The first terminal and the second terminal of the differential amplifier Op are configured to be coupled to the sensing lines SL1 and SL2, respectively. Therefore, the first coupling signal Pe1 and the second coupling signal Pe2 are superimposed on the sensing signals SS2 and SS1, respectively.

In the present embodiment, since the sensing line SL1 and the data line DL2 are separated by a longer distance, the noise on the sensing line SL1 is caused by almost the data line DL1. Similarly, the noise on the sensing line DL2 is caused by almost the data line DL2. As shown in FIG. 7, by alternately superimposing the first coupling signal Pe1 and the second coupling signal Pe2 on the sensing signals SS2 and SS1, respectively, the sensing signals SS1 and SS2 will have noises that have the same waveform and are completely cancelled out in the differential amplifier Op.

Moreover, the reset line 624 can directly receive the reset voltage Vre without through the aforementioned reset switch Re. The remaining connection manners, components, embodiments, and advantages of the aforementioned display driving circuit 300 are all applicable to the display driving circuit 600, and the description is not further provided herein for brevity.

In the aforementioned embodiments, multiple reading circuits (e.g., the reading circuits 3201-320n, 5201-520n, or 6201-620n) receive the same reset voltage Vre, but the present disclosure is not limited thereto. In some embodiments, the reset voltage Vre received by each of the multiple reading circuits may be the same as or different from the reset voltage Vre of other reading circuits, that is, the value of the reset voltage Vre of each reading circuit can be designed independently.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A display driving circuit suitable for a display device comprising a plurality of data lines and a plurality of sensing lines, and the display driving circuit comprising:
   a plurality of data circuits, wherein each data circuit is configured to provide a plurality of data signals to corresponding ones of the plurality of data lines; and
   a plurality of reading circuits, wherein each reading circuit is configured to compare a plurality of sensing signals on corresponding ones of the plurality of sensing lines to generate a sensing result, and is configured to generate a plurality of coupling signals according to the plurality of data signals of a corresponding one of the plurality of data circuits, respectively, and to provide the plurality of coupling signals to each of the corresponding ones of the plurality of sensing lines;
   wherein when the plurality of data signals have one or more rising edges, the plurality of coupling signals have one or more positive pulses, and when the plurality of data signals have one or more falling edges, the plurality of couplings signals have one or more negative pulses.

2. The display driving circuit of claim 1, wherein the reading circuit comprises:

a first coupling circuit configured to provide a first coupling signal among the plurality of coupling signals according to a first data signal among the plurality of data signals of the corresponding one of the plurality of data circuits, wherein when the first data signal has one of the one or more rising edges, the first coupling signal has one of the one or more positive pulses, when the first data signal has one of the one or more falling edges, the first coupling signal has one of the one or more negative pulses;

a reset line coupled to the first coupling circuit, and configured to transmit the plurality of coupling signals or a reset voltage; and a plurality of multiplex switches configured to be coupled between the reset line and the corresponding ones of the plurality of sensing lines.

3. The display driving circuit of claim 2, wherein a plurality of control terminals of the plurality of multiplex switches are configured to receive the same control signal.

4. The display driving circuit of claim 2, wherein the first coupling circuit comprises a variable capacitor, a first terminal of the variable capacitor is configured to receive the first data signal, and a second terminal of the variable capacitor is configured to provide the first coupling signal.

5. The display driving circuit of claim 2, wherein the reading circuit further comprises:

a second coupling circuit coupled to the reset line, and configured to provide a second coupling signal among the plurality of coupling signals according to a second data signal among the plurality of data signals of the corresponding one of the plurality of data circuits, wherein when the second data signal has one of the one or more rising edges, the second coupling signal has one of the one or more positive pulses, when the second data signal has one of the one or more falling edges, the second coupling signal has one of the one or more negative pulses.

6. The display driving circuit of claim 2, wherein the reading circuit further comprises:

a reset switch, wherein a first terminal of the reset switch is coupled to the reset line, and a second terminal of the reset switch is configured to receive the reset voltage.

7. The display driving circuit of claim 2, wherein the reading circuit further comprises:

a differential amplifier comprising a first terminal, a second terminal, and an output terminal, wherein the first terminal of the differential amplifier is configured to receive one of the plurality of sensing signals, and the second terminal of the differential amplifier is configured to receive another of the plurality of sensing signals, and the output terminal of the differential amplifier is configured to provide the sensing result.

8. The display driving circuit of claim 7, wherein the corresponding ones of the plurality of sensing lines comprises a first sensing line, a second sensing line, and a third sensing line, the first terminal of the differential amplifier is configured to be coupled to the first sensing line, and the reading circuit further comprises:

a multiplexer coupled to the second terminal of the differential amplifier, and configured to be coupled to the second sensing line and the third sensing line;

wherein the multiplexer is configured to selectively connect one of the second sensing line and the third sensing line to the second terminal of the differential amplifier.

9. A display driving circuit suitable for a display device comprising a plurality of data lines and a plurality of sensing lines, and the display driving circuit comprising:

a plurality of data circuits, wherein each data circuit is configured to provide a plurality of data signals to corresponding ones of the plurality of data lines; and a plurality of reading circuits, wherein each reading circuit is configured to compare a plurality of sensing signals on corresponding ones of the plurality of sensing lines to generate a sensing result, and is configured to generate a plurality of coupling signals according to the plurality of data signals of a corresponding one of the plurality of data circuits, respectively, and to provide the plurality of coupling signals to the corresponding ones of the plurality of sensing lines, respectively;

wherein when the plurality of data signals have one or more rising edges, the plurality of coupling signals have one or more positive pulses, and when the plurality of data signals have one or more falling edges, the plurality of couplings signals have one or more negative pulses.

10. The display driving circuit of claim 9, wherein the reading circuit comprises:

a first coupling circuit coupled to one of the corresponding ones of the plurality of sensing lines, and configured to provide a first coupling signal among the plurality of coupling signals according to a first data signal among the plurality of data signals of the corresponding one of the plurality of data circuits, wherein when the first data signal has one of the one or more rising edges, the first coupling signal has one of the one or more positive pulses, when the first data signal has one of the one or more falling edges, the first coupling signal has one of the one or more negative pulses;

a reset line configured to transmit a reset voltage; and a plurality of multiplex switches configured to be coupled between the reset line and the corresponding ones of the plurality of sensing lines.

11. The display driving circuit of claim 10, wherein a plurality of control terminals of the plurality of multiplex switches are configured to receive the same control signal.

12. The display driving circuit of claim 10, wherein the first coupling circuit is a variable capacitor, a first terminal of the variable capacitor is configured to receive the first data signal, and a second terminal of the variable capacitor is configured to provide the first coupling signal.

13. The display driving circuit of claim 10, wherein the reading circuit further comprises:

a second coupling circuit coupled to another of the corresponding ones of the plurality of sensing lines, and configured to provide a second coupling signal among the plurality of coupling signals according to a second data signal among the plurality of data signals of the corresponding one of the plurality of data circuits, wherein when the second data signal has one of the one or more rising edges, the second coupling signal has one of the one or more positive pulses, when the second data signal has one of the one or more falling edges, the second coupling signal has one of the one or more negative pulses.

14. The display driving circuit of claim 10, wherein the reading circuit further comprises:

a differential amplifier comprising a first terminal, a second terminal, and an output terminal, wherein the first terminal of the differential amplifier is configured to receive one of the plurality of sensing signals, and the second terminal of the differential amplifier is configured to receive another of the plurality of sensing signals, and the output terminal of the differential amplifier is configured to provide the sensing result.

15. A display device, comprising:
a plurality of data lines;
a plurality of sensing lines; and
a display driving circuit, comprising:
- a plurality of data circuits, wherein each data circuit is configured to provide a plurality of data signals to corresponding ones of the plurality of data lines; and
- a plurality of reading circuits, wherein each reading circuit is configured to compare a plurality of sensing signals on corresponding ones of the plurality of sensing lines to generate a sensing result, and is configured to generate a plurality of coupling signals according to the plurality of data signals of a corresponding one of the plurality of data circuits, respectively, and to provide the plurality of coupling signals to each of the corresponding ones of the plurality of sensing lines;

wherein when the plurality of data signals have one or more rising edges, the plurality of coupling signals have one or more positive pulses, and when the plurality of data signals have one or more falling edges, the plurality of coupling signals have one or more negative pulses.

16. The display device of claim 15, wherein the reading circuit comprises:
- a first coupling circuit configured to provide a first coupling signal among the plurality of coupling signals according to a first data signal among the plurality of data signals of the corresponding one of the plurality of data circuits, wherein when the first data signal has one of the one or more rising edges, the first coupling signal has one of the one or more positive pulses, when the first data signal has one of the one or more falling edges, the first coupling signal has one of the one or more negative pulses;
- a reset line coupled to the first coupling circuit, and configured to transmit the plurality of coupling signals or a reset voltage; and
- a plurality of multiplex switches configured to be coupled between the reset line and the corresponding ones of the plurality of sensing lines.

17. The display device of claim 16, wherein the first coupling circuit is a variable capacitor, a first terminal of the variable capacitor is configured to receive the first data signal, and a second terminal of the variable capacitor is configured to provide the first coupling signal.

18. The display device of claim 16, wherein the reading circuit further comprises:
- a second coupling circuit coupled to the reset line, and configured to provide a second coupling signal among the plurality of coupling signals according to a second data signal among the plurality of data signals of the corresponding one of the plurality of data circuits, wherein when the second data signal has one of the one or more rising edges, the second coupling signal has one of the one or more positive pulses, when the second data signal has one of the one or more falling edges, the second coupling signal has one of the one or more negative pulses.

19. The display device of claim 16, wherein the reading circuit further comprises:
- a differential amplifier comprising a first terminal, a second terminal, and an output terminal, wherein the first terminal of the differential amplifier is configured to receive one of the plurality of sensing signals, and the second terminal of the differential amplifier is configured to receive another of the plurality of sensing signals, and the output terminal of the differential amplifier is configured to provide the sensing result.

20. The display device of claim 19, wherein the corresponding ones of the plurality of sensing lines comprise a first sensing line, a second sensing line, and a third sensing line, the first terminal of the differential amplifier is configured to be coupled to the first sensing line, and the reading circuit further comprises:
- a multiplexer coupled to the second terminal of the differential amplifier, and configured to be coupled to the second sensing line and the third sensing line;

wherein the multiplexer is configured to selectively connect one of the second sensing line and the third sensing line to the second terminal of the differential amplifier.

* * * * *